(12) United States Patent
Hashimoto et al.

(10) Patent No.: US 10,892,656 B2
(45) Date of Patent: Jan. 12, 2021

(54) STATOR

(71) Applicant: AISIN AW CO., LTD., Anjo (JP)

(72) Inventors: Shingo Hashimoto, Okazaki (JP); Shingo Sato, Okazaki (JP); Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 427 days.

(21) Appl. No.: 15/563,230

(22) PCT Filed: Jun. 8, 2016

(86) PCT No.: PCT/JP2016/066987
§ 371 (c)(1),
(2) Date: Sep. 29, 2017

(87) PCT Pub. No.: WO2016/199788
PCT Pub. Date: Dec. 15, 2016

(65) Prior Publication Data
US 2018/0091013 A1    Mar. 29, 2018

(30) Foreign Application Priority Data

Jun. 12, 2015 (JP) ................... 2015-119214
Nov. 27, 2015 (JP) ................... 2015-231410

(51) Int. Cl.
H02K 3/12    (2006.01)
H02K 15/04   (2006.01)
(Continued)

(52) U.S. Cl.
CPC ............... *H02K 3/12* (2013.01); *H02K 3/04* (2013.01); *H02K 3/28* (2013.01); *H02K 3/50* (2013.01);
(Continued)

(58) Field of Classification Search
CPC .. H02K 3/04; H02K 3/12; H02K 3/28; H02K 3/50; H02K 15/045; H02K 15/105
(Continued)

(56) References Cited

U.S. PATENT DOCUMENTS

2010/0207466 A1    8/2010    Endo et al.
2012/0112595 A1    5/2012    Watanabe et al.
(Continued)

FOREIGN PATENT DOCUMENTS

CN    102577035 A    7/2012
EP    2 696 476 A1    2/2014
(Continued)

OTHER PUBLICATIONS

Mar. 27, 2018 European Search Report issued in Patent Application No. 16807494.6.
(Continued)

*Primary Examiner* — Shawki S Ismail
*Assistant Examiner* — Monica Mata
(74) *Attorney, Agent, or Firm* — Oliff PLC

(57) ABSTRACT

A stator, wherein the coil unit includes a coil end portion projecting from an axial end face of the stator core; the coil end portion includes a plurality of peak portions projecting axially outward and arranged in a circumferential direction, and a plurality of lead wire portions for supplying electric power to the coils; and each of the lead wire portions includes an extension portion extending at least in an axial direction, and a bent portion that is bent at least from the axial direction to a radial direction, at least a part of the bent portion being disposed on a stator core side with respect to the peak portions in the axial direction, in a space between the peak portions that are closest to the extension portion in the radial direction and that are adjacent in the circumferential direction.

20 Claims, 9 Drawing Sheets

(51) Int. Cl.
*H02K 3/28* (2006.01)
*H02K 3/50* (2006.01)
*H02K 3/04* (2006.01)
*H02K 15/10* (2006.01)

(52) U.S. Cl.
CPC ......... *H02K 15/045* (2013.01); *H02K 15/105* (2013.01)

(58) Field of Classification Search
USPC ....................................................... 310/179
See application file for complete search history.

(56) References Cited

U.S. PATENT DOCUMENTS

| | | |
|---|---|---|
| 2012/0217836 A1 | 8/2012 | Watanabe et al. |
| 2014/0015367 A1 | 1/2014 | Umehara et al. |
| 2014/0021823 A1 | 1/2014 | Kitamura et al. |
| 2016/0156238 A1* | 6/2016 | Tsuiki ..................... H02K 3/12 |

FOREIGN PATENT DOCUMENTS

| | | |
|---|---|---|
| JP | 2012-125043 A | 6/2012 |
| JP | 2012-249344 A | 12/2012 |
| JP | 2013-5541 A | 1/2013 |
| WO | 2012/137273 A1 | 10/2012 |
| WO | 2013/190894 A1 | 12/2013 |

OTHER PUBLICATIONS

Sep. 6, 2016 International Search Report issued in Patent Application No. PCT/JP2016/066987.
Aug. 25, 2017 European Search Report issued in Patent Application No. 15832281.8.
Jan. 10, 2019 Office Action issued in U.S. Appl. No. 15/323,008.
U.S. Appl. No. 15/323,008, filed Dec. 29, 2016 in the name of Shingo Hashimoto et al.
Nov. 2, 2015 International Search Report issued in International Patent Application No. PCT/JP2015/072566.

* cited by examiner

STATOR

BACKGROUND

The present disclosure relates to a stator.

There is known a stator that is provided with a coil formed of a plurality of coil units. This type of stator is disclosed in, for example, Japanese Patent Application Publication No. 2012-125043 (JP 2012-125043 A), In a stator disclosed in JP 2012-125043 A, a cage coil (coil) is formed of a plurality of concentrically wound coils (coil units), each formed by concentrically winding a rectangular conductor. The cage coil includes a coil end portion projecting from an axial end face of a stator core. Further, a lead-side coil end conductor (a winding start portion or a winding end portion disposed on the lead side (power supply side)) of each concentrically wound coil is bent from the radially inner side to the radially outer side of the stator core. Note that the lead-side coil end conductor of the concentrically wound coil includes a bent portion (a rounded portion), and a portion extending from the bent portion to the end.

In a conventional stator such as that disclosed in JP 2012-125043 A, a lead-side coil end conductor of each concentrically wound coil is bent on the axially outer side with respect to peak portions of a coil end portion (at a position that is further from the core end face than the peak portions of the coil end portion are) so as not to be in contact with the coil end portion (see FIGS. 8 and 12 of JP 2012-125043 A).

SUMMARY

However, the conventional stator such as that disclosed in JP 2012-125043 A has a problem in that since the lead-side coil end conductor of each concentrically wound coil is bent on the axially outer side with respect to the peak portions of the coil end portion (at the position that is further from the core end face than the peak portions of the coil end portion are), the axial size of the stator is increased.

An exemplary aspect of the disclosure provides a stator that can be prevented from being increased in the axial size.

In order to achieve the above object, a stator according to one aspect of the present disclosure includes: a stator core having a plurality of slots; and a coil unit formed of a plurality of coils disposed in the plurality of slots; wherein the coil unit includes a coil end portion projecting from an axial end face of the stator core; wherein the coil end portion includes a plurality of peak portions projecting axially outward and arranged in a circumferential direction, and a plurality of lead wire portions for supplying electric power to the coils; and wherein each of the lead wire portions includes an extension portion extending at least in an axial direction, and a bent portion that is bent at least from the axial direction to a radial direction, at least a part of the bent portion being disposed on a stator core side with respect to the peak portions in the axial direction, in a space between the peak portions that are closest to the extension portion in the radial direction and that are adjacent to each other in the circumferential direction.

In the stator according to the one aspect of the present disclosure, as described above, at least a part of the bent portion is disposed on a stator core side with respect to the peak portions in the axial direction, in a space between the peak portions that are closest to the extension portion in the radial direction and that are adjacent to each other in the circumferential direction. Thus, compared to the case where the bent portion is bent on the axially outer side with respect to the peak portions of the coil end portion, the lead wire portion is bent on the axially inner side, and therefore it is possible to prevent an increase in the axial size of the coil end portion. As a result, it is possible to prevent an increase in the axial size of the stator.

According to the present disclosure, as described above, it is possible to prevent an increase in the axial size,

DETAILED DESCRIPTION OF EMBODIMENTS

An embodiment of the present disclosure will be described with reference to the drawings.

Embodiment (Structure of Stator)

The structure of a stator 100 according to the present embodiment will be described with reference to FIGS. 1 to 14. In the following description, the "axial direction", "radial direction", and "circumferential direction" refer to the directions with respect to a stator core 10. Further, the "axially outer side" refers to the side away from the stator core 10 in the axial direction. The "axially inner side" refers to the side toward the stator core 10 in the axial direction. Further, the "radially outer side" refers to the side toward which the diameter of the stator core 10 increases in the radial direction. The "radially inner side" refers to the side toward which the diameter of the stator core 10 decreases in the radial direction.

Figure 1:
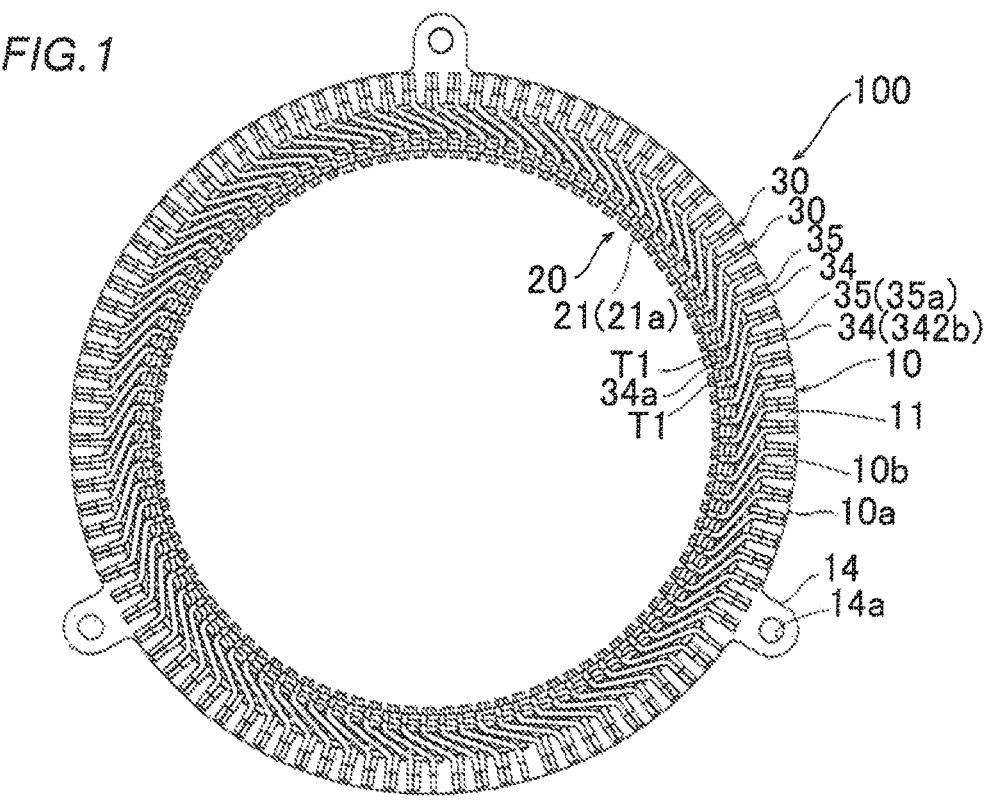
FIG. 1 is a top view of a stator according to an embodiment of the present disclosure.
Figure 2:
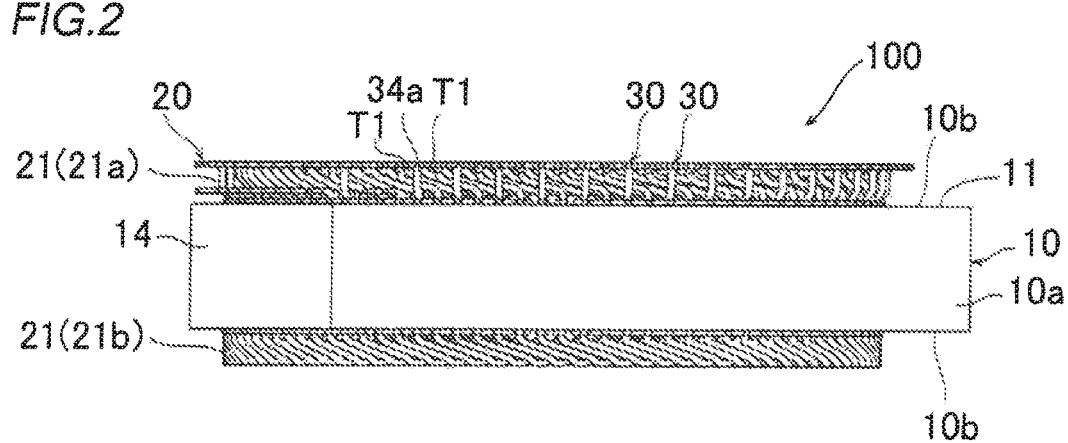
FIG. 2 is a side view of the stator according to the embodiment of the present disclosure.
Figure 3:
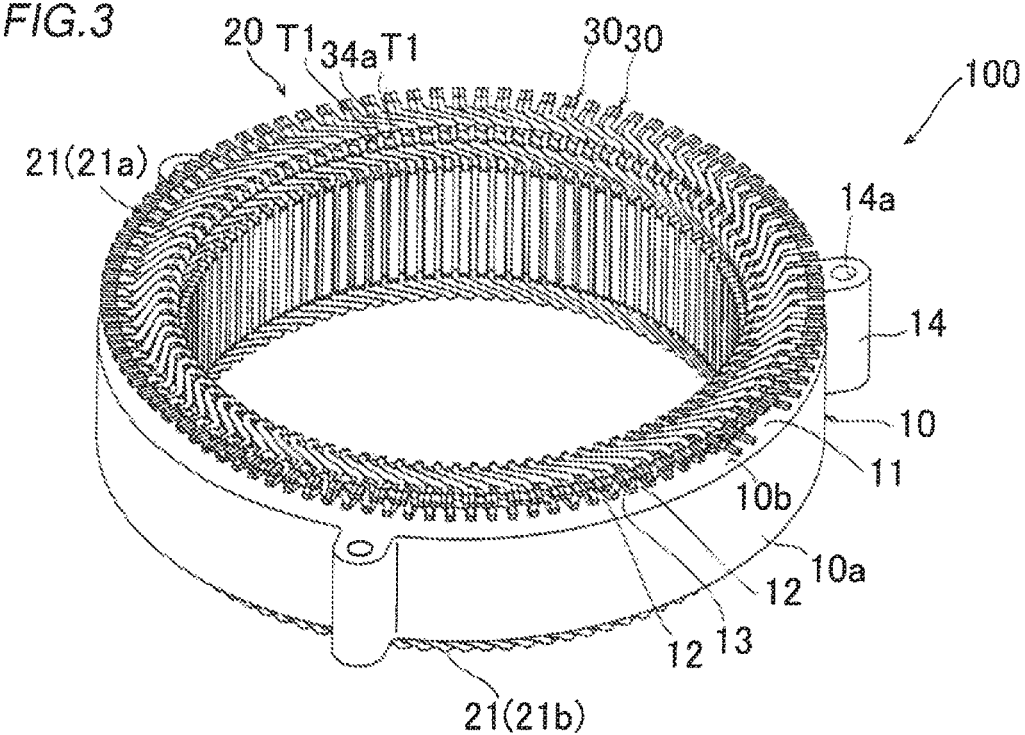
FIG. 3 is a perspective view of the stator according to the embodiment of the present disclosure.

As illustrated in FIGS. 1 to 3, the stator 100 includes the stator core 10 and a coil unit 20 (concentrically wound coils 30). The concentrically wound coils 30 are an example of "coils."

The stator core 10 is formed in an annular shape (a hollow cylindrical shape). Note that the annular stator core 10 includes a stator core that is formed by assembling split cores. An inner diameter space for accommodating a rotor (not illustrated) is formed on the radially inner side of the stator core 10. The stator core 10 is formed by axially stacking a plurality of electrical steel plates coated with an insulating material.

As illustrated in FIG. 3, the stator core 10 includes a back yoke 11 formed in an annular shape, and a plurality of teeth 12 extending radially inward from the back yoke 11. The plurality of teeth 12 are disposed on the stator core 10 at substantially equal angular intervals in the circumferential direction. Further, slots 13 are formed between the adjacent teeth 12.

The stator core 10 is provided with ear portions 14 for fixing the stator 100 to a motor case (not illustrated). The ear portions 14 are formed to project outward from the radially outer end face (an outer peripheral face 10a) of the stator core 10. The plurality of ear portions 14 are provided in the circumferential direction. For example, three ear portions 14 are disposed at substantially equal angular intervals. Each car portion 14 is provided with a through hole 14a axially extending therethrough. The stator 100 is fixed to the motor case by threading bolts (not illustrated) into the motor case through the through holes 14a of the ear portions 14.

(Structure of Coil)

Figure 4:
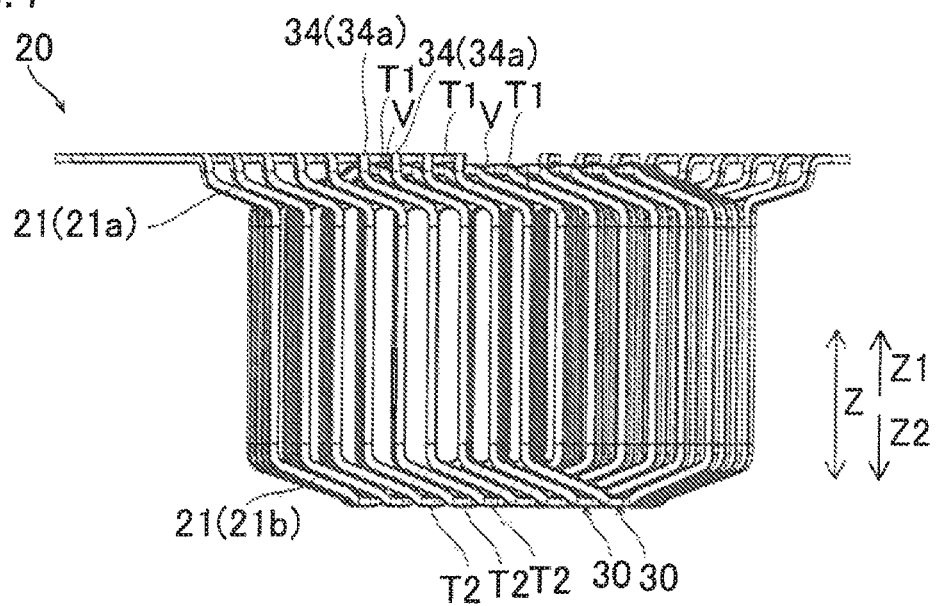
FIG. 4 is a side view of coils as viewed from the radially inner side according to the embodiment of the present disclosure.

As illustrated in FIG. 4, the coil unit 20 is formed of the plurality of concentrically wound coils 30 that are inserted in the plurality of slots 13. The coil unit 20 is formed by arranging the plurality of concentrically wound coils 30 in the circumferential direction. The coil unit 20 has an annular cage shape. In the case where the stator 100 is applied to a three-phase AC motor, each concentrically wound coil 30 forms one of a U-phase coil, a V-phase coil, and a W-phase coil.

The coil unit 20 includes coil end portions 21 projecting from respective axial end faces 10b (see FIGS. 2 and 3) of the stator core 10. The coil end portions 21 include a coil end portion 21a disposed on the lead side (power supply side) and a coil end portion 21b disposed on the side opposite to the lead side.

The coil end portion 21a disposed on the lead side includes a plurality of peak portions T1 projecting axially outward (to a Z1 direction) and arranged in the circumferential direction. The coil end portion 21a further includes a plurality of lead wire portions 34 (lead wire portions 34 of the concentrically wound coils 30 described below) for supplying electric power to the concentrically wound coils 30. Valley portions V are disposed between the peak portions T1 that are arranged in the circumferential direction. Meanwhile, the coil end portion 21b disposed on the side opposite to the lead side includes a plurality of peak portions T2 projecting axially outward (to a Z2 direction) and arranged in the circumferential direction.

The peak portions T1 are the axially outermost portions, except the lead wire portions 34 (35) described below, in the coil end portion 21a projecting axially outward with respect to the stator core 10. The plurality of peak portions T1 are arranged on the same diameter in the circumferential direction, and also arranged in the radial direction. Each peak portion T1 is included in a portion (a crank portion 32a described below) radially offsetting the concentrically wound coils 30 disposed in the slots 13 that are adjacent to each other in the circumferential direction.

Further, each valley portion V is disposed in the circumferential direction between the peak portions T1 that are adjacent in the circumferential direction, and is a gap portion on the stator core 10 side (a lower portion) with respect to the peak portions T1 in the axial direction, in the coil end portion 21a projecting axially outward with respect to the stator core 10. The plurality of valley portions V are arranged on the same diameter in the circumferential direction, and also arranged in the radial direction.

(Structure of Concentrically Wound Coil)

Figure 5:
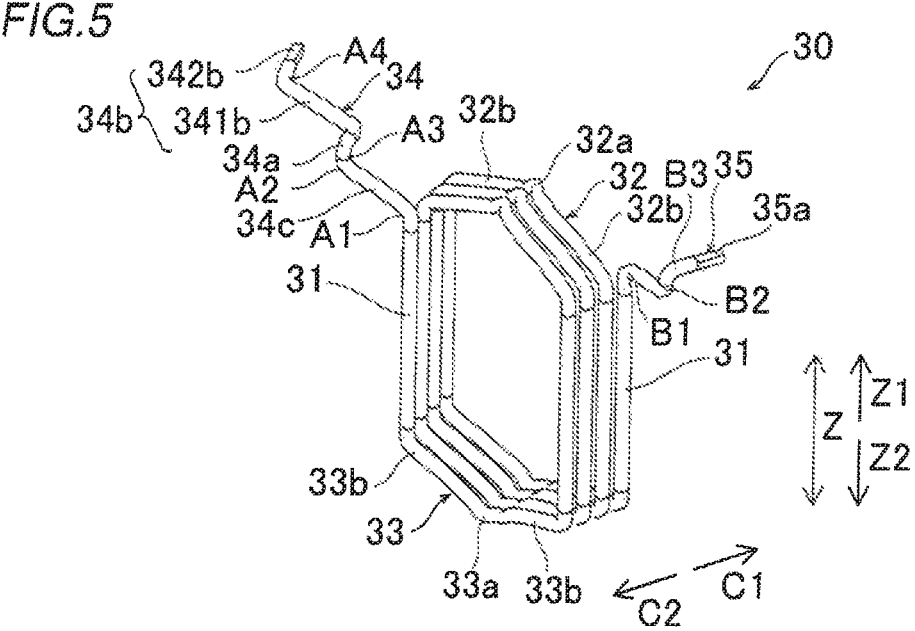
FIG. 5 is a perspective view of a concentrically wound coil according to the embodiment of the present disclosure.
Figure 6:
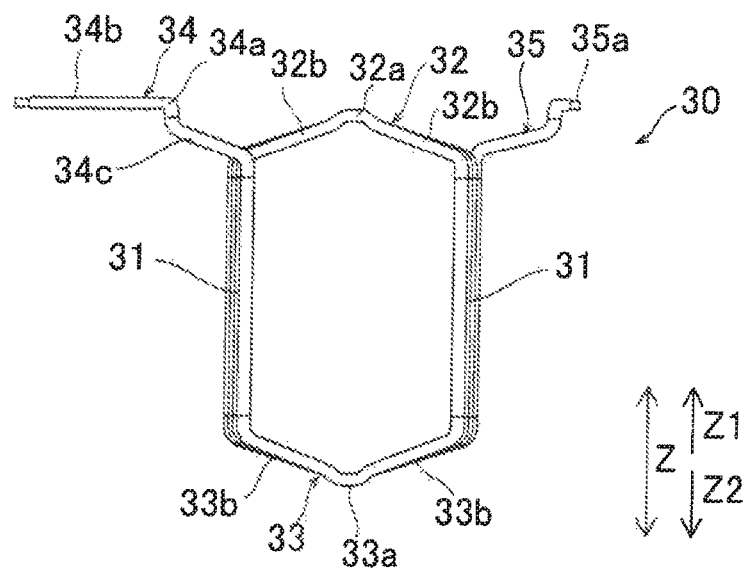
FIG. 6 is a side view of the concentrically wound coil according to the embodiment of the present disclosure.
Figure 7:
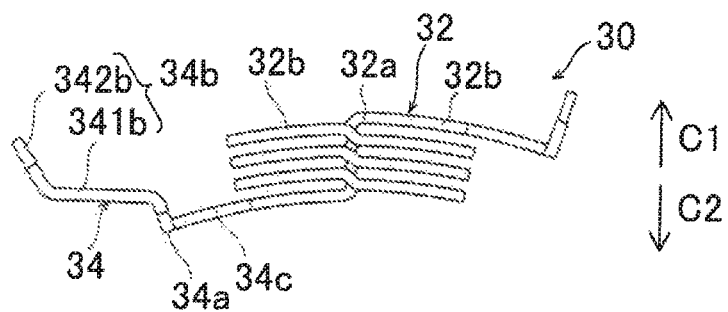
FIG. 7 is a diagram illustrating the concentrically wound coil as viewed from the upper side according to the embodiment of the present disclosure.

As illustrated in FIGS. 5 to 7, the concentrically wound coil 30 is formed by winding a rectangular conductor having a substantially rectangular cross-sectional shape. More specifically, the concentrically wound coil 30 is formed by edgewise bending that bends the short side of the cross-section of the rectangular conductor, such that rectangular conductor is wound in a substantially hexagonal shape. The rectangular conductor is made of a highly conductive metal (for example, copper, aluminum, and the like). Note that the corners of the cross-section of the rectangular conductor may be chamfered (rounded) into round shapes. Further, the plurality of concentrically wound coils 30 are disposed on the stator core 10 in the circumferential direction (see FIG. 4). Note that the upper end (the crank portion 32a described below) of the substantially hexagonal concentrically wound coil 30 forms the peak portion T1.

The concentrically wound coil 30 includes in-slot conductor portions 31 accommodated in the slots 13, lead-side coil end conductor portions 32 disposed on the lead side (the power supply side, the Z1 direction side), and non-lead-side coil end conductor portions 33 disposed on the side (the Z2 direction side) opposite to the lead side.

Further, the lead-side coil end conductor portions 32 each include the crank portion 32a formed in a crank shape that is bent stepwise in the radial direction of the stator core 10, and a curved portion 32b that is curved in an arc shape along the arc of the annular stator core 10. Similar to the lead-side coil end conductor portions 32, the non-lead-side coil end conductor portions 33 each include a crank portion 33a and a curved portion 33b.

Figure 8:
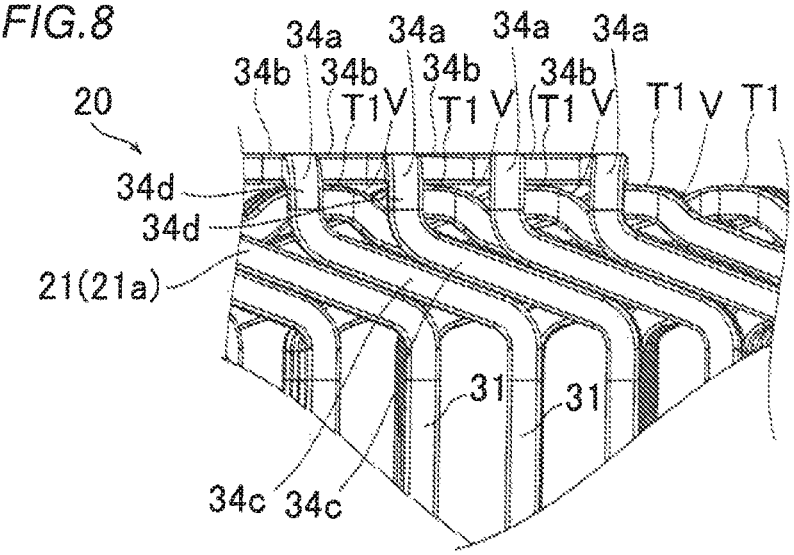
FIG. 8 is a partially enlarged view of FIG. 4 (the side view of the coils as viewed from the radially inner side) according to the embodiment of the present disclosure.

Further, as illustrated in FIG. 8, the crank portions 32a of the respective plurality of concentrically wound coils 30 form the plurality of peak portions T1 of the coil end portion 21a that project axially outward and that are arranged in the circumferential direction. Further, the valley portion V is formed between the peak portion T1 of one concentrically wound coil 30 and the peak portion T1 of another concentrically wound coil 30 that are arranged in the circumferential direction. The peak portions T1 and the valley portions V are alternately disposed in the circumferential direction throughout the circumference of the coil end portion 21a.

Further, as illustrated in FIG. 5, the lead wire portion 34 that is bent from the radially inner side to the radially outer side (the C1 direction side) is provided at one of the winding start portion and the winding end portion of the concentrically wound coil 30. Meanwhile, a lead wire portion 35 that is bent from the outer peripheral side of the concentrically wound coil 30 to the radially outer side is provided at the other one of the winding start portion and the winding end portion of the concentrically wound coil 30. The lead wire portion 34 and the lead wire portion 35 are provided in each of the plurality of concentrically wound coils 30.

<Structure of Lead Wire Portion 34>

Each of the lead wire portions 34 includes a bent portion 34a that is bent from the radially inner side (the C2 direction side) to the radially outer side of the stator core 10. More specifically, the rectangular conductor (the in-slot conductor portion 31) formed to extend in the axial direction (a Z direction) is bent on the axially outer side (at a point A1) of the end face 10b of the stator core 10 to cross the axial direction. Then, the rectangular conductor is bent again at a point A2 to extend in the axial direction (the Z direction), and is bent at an angle of approximately 90 degrees at a point A3 from the radially inner side to the radially outer side of the stator core 10. Thus, the bent portion 34a is formed.

Further, an extension portion 34c extending at least in the axial direction is provided between the in-slot conductor portion 31 and the bent portion 34a. More specifically, the extension portion 34c is provided to extend axially outward to cross the Z direction.

Figure 13:
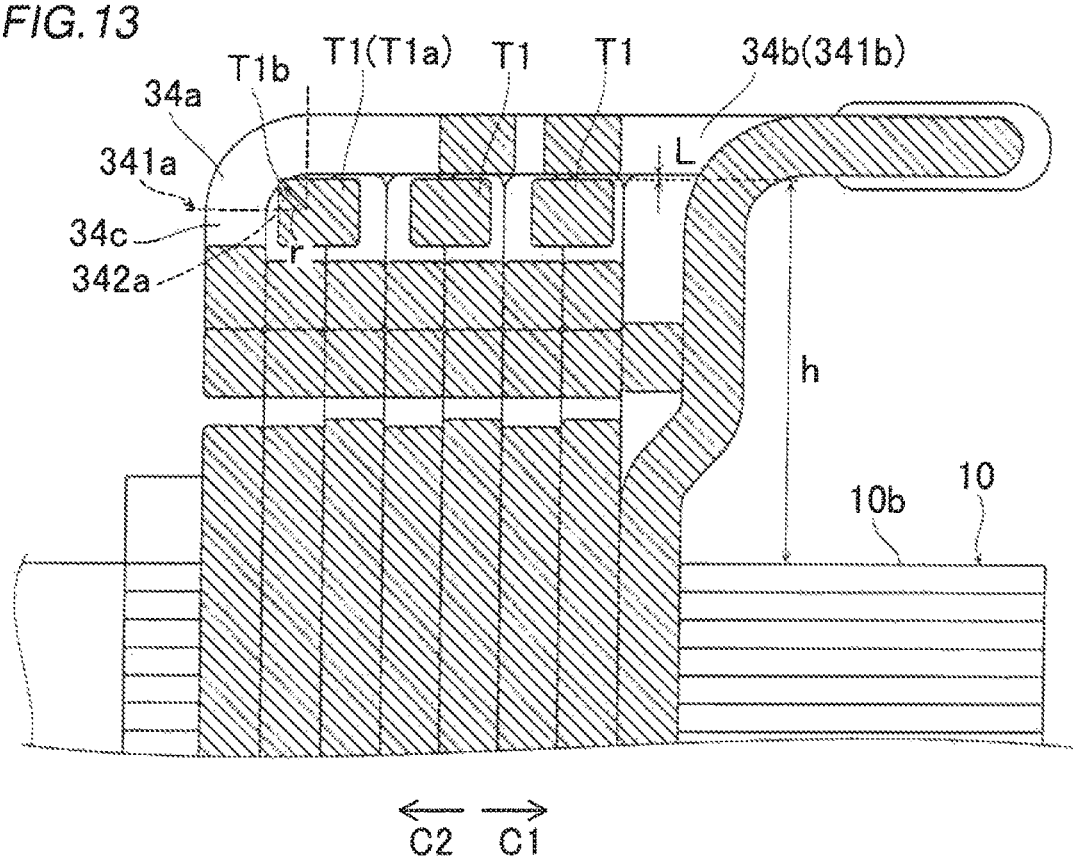
FIG. 13 is a schematic diagram of peak portions and a bent portion as viewed from the circumferential direction.

That is, as illustrated in FIGS. 8 and 13, the lead wire portion 34 includes the extension portion 34c disposed on the lead side and projecting at least axially outward from the axial end face 10b of the stator core 10, and an end-side portion 34b extending at least in the radial direction on the axially outer side with respect to the stator core 10 (note that the end-side portion 34b may extend not only in the radial direction, but also in the circumferential direction). The lead wire portion 34 further includes, between the extension portion 34c and the end-side portion 34b, the bent portion 34a that is bent from the axial direction to at least the radial direction such that the extension portion 34c extending in the axial direction is connected to the end-side portion 34b extending in the radial direction. The bent portion 34a extends from a bend start point to the end point. The bend start point refers to a point where the extension portion 34c starts to bend at least in the radial direction, and the bend end point of the bent portion 34a refers to the end-side portion 34b extending in the radial direction. The extension portion 34c extends in the axial direction or the circumferential direction, but does not extend in the radial direction. Accordingly, since the extension portion 34c does not extend in the radial direction, it is possible to prevent an increase in the radial size while preventing an increase in the axial size of the stator 100.

The extension portion 34c projects in the axial direction on the radially innermost side or the radially outermost side, in the coil end portion 21a projecting from the stator core 10. The end-side portion 34b extends at least in the radial direction, along the plurality of peak portions T1 on the axially outer side with respect to the peak portions T1, or along the core end face (the axial end face 10b). The end-side portion 34b is disposed apart from the peak portions T1 in the axial direction. Note that the end-side portion 34b may be in contact with the peak portions T1, instead of being spaced apart. The end-side portion 34b extends parallel to the plurality of peak portions T1 or the core end face (the axial end face 10b) in the radial direction.

Figure 11:
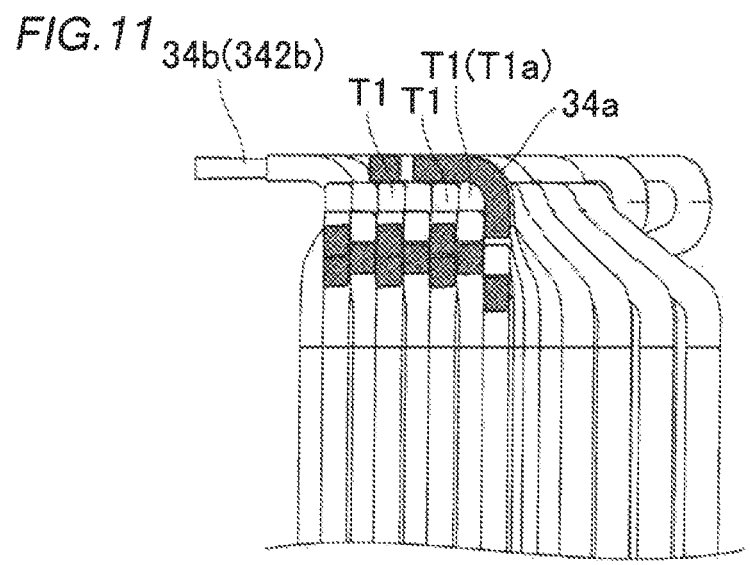
FIG. 11 is a cross-sectional view taken along line 200-200 in FIG. 9.
Figure 12:
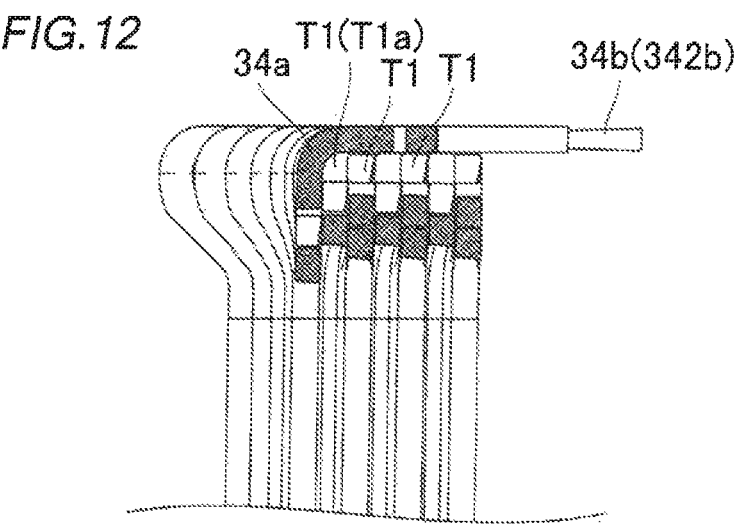
FIG. 12 is a cross-sectional view taken along line 300-300 in FIG. 9.

In the present embodiment, as illustrated in FIGS. 8 to 13, at least a part of the bent portion 34a is disposed on the stator core 10 side (the side closer to the axial end face 10b of the stator core 10) with respect to the peak portions T1 in the axial direction, in a space between the peak portions T1 that are closest to the extension portion 34c in the radial direction and that are adjacent in the circumferential direction (a D direction, see FIG. 13). That is, at least a part of the bent portion 34a is disposed in the valley portion V closest to the extension portion 34c in the radial direction. Further, the bent portion 34a is disposed between the peak portions T1 arranged in the circumferential direction (see FIGS. 8 to 10), so as to overlap the peak portions T1 (see FIGS. 11 to 13), as viewed from the circumferential direction. More specifically as illustrated in FIG. 8, the bent portion 34a is disposed between the two peak portions T1 arranged in the circumferential direction, as viewed from the radially inner side. Further, as illustrated in FIGS. 11 to 13, the bent portion 34a is disposed to overlap the peak portions T1, as viewed from the circumferential direction. More specifically, the bent portion 34a is disposed to overlap the peak portions T1 as viewed from one side in the circumferential direction (see FIG. 11), and as viewed from the other side in the circumferential direction (see FIG. 12).

Further, as illustrated in FIG. 8, the extension portion 34c on the radially innermost side is disposed in the valley portion V on the radially inner side, and the bent portion 34a of the lead wire portion 34 is disposed in the valley portion V to overlap the peak portions T1 on the radially inner side as viewed from the circumferential direction. Further, in the present embodiment, a circumferential width portion 34d of the bent portion 34a is disposed not to overlap the peak portions T1 as viewed from the radially inner side.

Further, as illustrated in FIG. 13, a bend start point 341a of the bent portion 34a is disposed on the stator core 10 side (the Z2 direction side) with respect to the peak portions T1 (a height position h of the peak portions T1 from the end face 10b of the stator core 10), as viewed from the circumferential direction.

Figure 14:
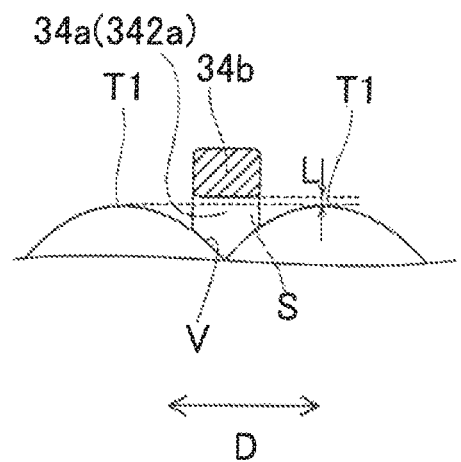
FIG. 14 is a schematic diagram of the peak portions and the bent portion as viewed from the radially outer side.

Further, in the present embodiment, as illustrated in FIG. 14, the bent portion 34a is disposed in the valley portion V between the peak portions T1 arranged in the circumferential direction. More specifically, as viewed from the radially outer side, a stator-core-10-side (Z2-direction-side) portion of the bent portion 34a (an inner portion 342a of the bent portion 34a described below) is disposed in the valley portion V.

Further, in the present embodiment, as illustrated in FIG. 14, the bent portion 34a is bent from the innermost peripheral side of the stator core 10 to the radially outer side, and is disposed between the peak portions T1 (peak portions T1a) located on the innermost peripheral side. More specifically, as illustrated in FIG. 13, the bent portion 34a is disposed such that the inner portion 342a of the bent portion 34a overlaps a corner portion T1b (the corner portion T1b on the radially inner side and the axially outer side) of the peak portion T1 disposed on the innermost peripheral side, as viewed from the circumferential direction.

Further, in the present embodiment, as illustrated in FIG. 14, the bent portion 34a is disposed between the peak portions T1 arranged in the circumferential direction, while being spaced apart from the peak portions T1. More specifically, as viewed from the axially outer side, the bent portion 34a is disposed between the peak portions T1 (in the valley portion V), while being spaced apart (being disposed with a space S) from the peak portions T1 arranged in the circumferential direction. Note that the bent portion 34a is disposed between the peak portions T1 (in the valley portion V), while being disposed with the space S in both the circumferential direction and the radial direction.

Further, in the present embodiment, the bent portion 34a is formed by flatwise bending that bends the long side of the cross-section of the rectangular conductor. More specifically, as illustrated in FIG. 5, the in-slot conductor portions 31, the lead-side coil end conductor portions 32, and the non-lead-side coil end conductor portions 33 are formed by edgewise bending that bends the short side of the cross-section of the rectangular conductor. Further, the rectangular conductor is bent edgewise at the point A1 and the point A2, and then bent flatwise at the point A3 from the radially inner side to the radially outer side, so that the bent portion 34a is formed.

Figure 9:
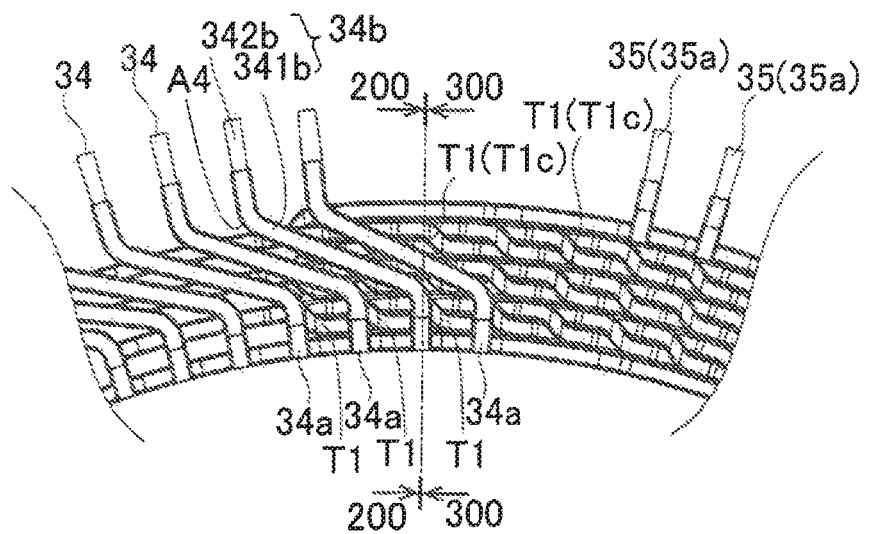
FIG. 9 is an enlarged view of the coils as viewed from the upper side according to the embodiment of the present disclosure.
Figure 10:
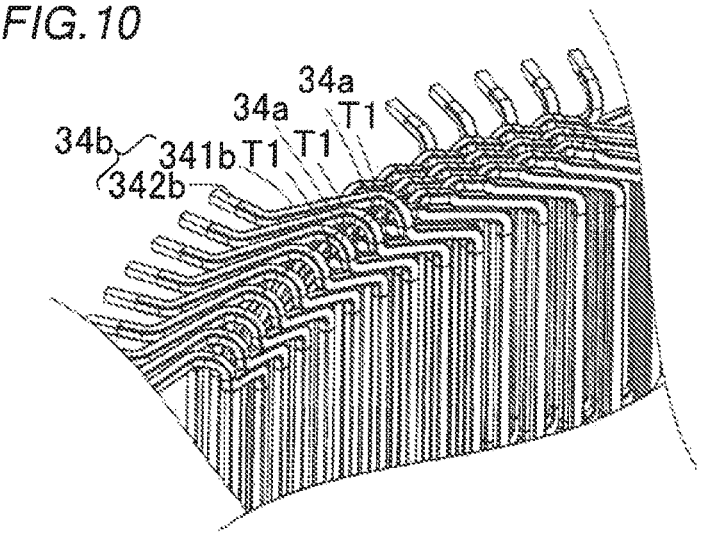
FIG. 10 is a perspective view of the coils as viewed from the radially inner side according to the embodiment of the present disclosure.

Further, in the present embodiment, as illustrated in FIG. 9, the lead wire portion 34 includes the end-side portion 34b extending radially outward while being spaced apart (being spaced with a distance L, see FIG. 13) from the peak portions T1 so as to be continuous from the bent portion 34a that is disposed apart from the peak portions T1. The end-side portion 34b includes a portion 341b extending to cross (to cross at an angle less than 90 degrees) the circumferential direction, as viewed from the axial direction, and a connection portion 342b formed by bending the rectangular conductor at a point A4 and extending in the radial direction. A portion (the portion 341b) of the end-side portion 34b is disposed on the axially outer side of the peak portions T1, and is disposed to extend substantially linearly. The connection portion 342b is an example of a "distal end portion".

Further, in the present embodiment, as illustrated in FIG. 13, the distance L between the end-side portion 34b and the peak portions T1 is less than an inner curvature radius r of the bent portion 34a. Thus, by bending the lead wire portion 34 from the radially inner side to the radially outer side, the bent portion 34a is disposed between the peak portions T1 arranged in the circumferential direction, so as to overlap the peak portions T1, as viewed from the circumferential direction.

<Structure of Lead Wire Portion 35>

As illustrated in FIG. 5, in the lead wire portion 35, the rectangular conductor (the in-slot conductor portion 31) formed to extend in the axial direction (the Z direction) is bent on the axially outer side (at a point B1) of the end face 10b of the stator core 10 to extend in the circumferential direction. Then, the rectangular conductor is bent again at a point B2 to extend in the axial direction (the Z direction), and is bent radially outward at an angle of approximately 90 degrees at a point B3. Thus, a connection portion 35a is formed.

On the present embodiment, as illustrated in FIG. 9, the connection portion 342b of each of the plurality of lead wire portions 34 is configured to be disposed on the outer side with respect to the peak portions T1. (T1c) disposed on the outermost periphery, as viewed from the axial direction. The connection portion 35a of each of the plurality of lead wire portions 35 is configured to be disposed on the outer side with respect to the peak portions T1 disposed on the outermost periphery, as viewed from the axial direction. As illustrated in FIG. 9, the connection portion 342b of one lead wire portion 34 and the connection portion 35a of another lead wire portion 35 among the plurality of concentrically wound coils 30 are connected on the outer side with respect to the peak portions T1 disposed on the outermost periphery, as viewed from the axial direction. Further, as illustrated in FIG. 1, the connection portion 342b and the connection portion 35a are connected (welded) on the radially outer side of the stator core 10 while the connection portion 342b and the connection portion 35a are arranged in the circumferential direction. That is, the concentrically wound coils 30 are continuous coils configured such that the connection portion 342b of one lead wire portion 34 on the radially inner side and the connection portion 35a of another lead wire portion 35 on the radially outer side among the plurality of concentrically wound coils 30 need to be connected (welded).

(Effects of the Embodiment)

According to the present embodiment, the following effects can be obtained.

In the present embodiment, as described above, at least a part of the bent portion 34a is disposed on the stator core 10 side with respect to the peak portions T1 in the axial direction, in a space between the peak portions T1 that are closest to the extension portion 34c in the radial direction and that are adjacent in the circumferential direction. Thus, compared to the case where the bent portion 34a is bent at the position that is further from the axially outer side than the peak portions T1 of the coil end portion 21a are, the lead wire portion 34 is bent on the axially inner side, and therefore it is possible to prevent an increase in the axial size of the coil end portion 21a accordingly. As a result, it is possible to prevent an increase in the axial size of the stator 100. That is, the axial size of the stator 100 depends on the position of the bent portion 34a of the lead wire portion 34. That is, the end-side portion 34b of the lead wire portion 34 can be disposed closer to the axial end face 10b side of the stator core 10 depending on how (where) the bent portion 34a is bent. Therefore, in order to prevent an increase in the axial size of the stator 100, it is especially important to lower the position of the bent portion 34a (locate the bent portion 34a closer to the end face 10b side). Accordingly, in the present embodiment, at least a part of the bent portion 34a is disposed in the valley portion V (a low position) between the peak portions T1 such that the end-side portion 34b of the lead wire portion 34 is located closer to the axial end face 10b side of the stator core 10, thereby preventing an increase in the axial size of the stator 100.

Further, since the coil end portion 21a is prevented from being increased in the axial size, the total length of the rectangular conductor forming the concentrically wound coil 30 is reduced. Therefore, the required length of the rectangular conductor can be reduced. Further, since the total length of the rectangular conductor is reduced, the copper loss can be reduced. Therefore, the efficiency (the ratio of mechanical output power to electrical input power) of the motor using the stator 100 according to the present embodiment can be improved.

Further, in the present embodiment, as described above, the circumferential width portion 34d of the bent portion 34a is disposed not to overlap the peak portions T1 as viewed from the radially inner side. Thus, at least a part of the bent portion 34a can easily be disposed in the valley portion V closest to the extension portion 34c in the radial direction.

Further, in the present embodiment, as described above, the coil end portion 21a includes the valley portions V each disposed between the peak portions T1 arranged in the circumferential direction, and the bent portions 34a are disposed in the valley portions V. Thus, the bend of the lead wire portion 34 starts in the valley portion V on the axially inner side with respect to the peak portions T1, and therefore the bent portion 34a can easily be disposed between the peak portions T1 arranged in the circumferential direction, so as to overlap the peak portions T1 as viewed from the circumferential direction.

Further, in the present embodiment, as described above, the bent portion 34a is bent from the innermost peripheral side of the stator core 10 to the radially outer side, and is disposed between the peak portions T1 located on the innermost peripheral side. Thus, even in the case where the bend of the lead wire portion 34 starts at a height position lower than the height position h of the peak portions T1, the lead wire portion 34 can be bent to the radially outer side while preventing the bent portion 34a and the peak portions T1 from coming into contact with each other.

Further, in the present embodiment, as described above, the bent portion 34a is disposed between the peak portions T1 arranged in the circumferential direction, while being spaced apart from the peak portions T1 Thus, even in the case where the bent portion 34a is disposed between the peak portions T1 arranged in the circumferential direction so as to overlap the peak portions T1, it is possible to prevent the bent portion 34a and the peak portions T1 from coming into contact with each other. Therefore, it is possible to prevent damage to the rectangular conductor due to contact between the bent portion 34a and the peak portions T1.

Further, in the present embodiment, as described above, the lead wire portion 34 includes the end-side portion 34b extending radially outward while being spaced apart from the peak portions T1 so as to be continuous from the bent portion 34a that is disposed apart from the peak portions T1. Thus, both the bent portion 34a and the end-side portion 34b are spaced apart from the peak portions T1. Therefore, it is possible to more effectively prevent damage to the rectangular conductor due to contact between the lead wire portion 34 and the peak portions T1.

Further, in the present embodiment, as described above, the distance L between the end-side portion 34b and the peak portions T1 is less than the inner curvature radius r of the bent portion 34a. Thus, the bent portion 34a is disposed between the peak portions T1 arranged in the circumferential direction, so as to overlap the peak portions T1, as viewed from the circumferential direction. Therefore, it is possible to restrain the axial size of the entire coil end portion 21a.

Further, in the present embodiment, as described above, the portion 341b of the end-side portion 34b is disposed on the axially outer side of the peak portions T1, and is disposed to extend substantially linearly. Thus, compared to the case where the portion 341b of the end-side portion 34b is formed in a shape (such as a bent shape and a curved shape) other than the substantially linear shape, the size of the portion 341b can be reduced. As a result, it is possible to further reduce required length of the rectangular conductor, and to further improve the efficiency of the motor.

Further, in the present embodiment, as described above, the connection portion 342b of each of the plurality of lead wire portions 34 is disposed on the outer side with respect to the peak portions T1 disposed on the outermost periphery, as viewed from the axial direction. Thus, it is possible to perform work for connecting (work for welding) the connection portion 342b of each lead wire portion 34 on the outer peripheral side of the stator core 10, which is a relatively large space. Accordingly, it is possible to perform work for connecting (work for welding) the connection portion 342b while preventing interference between the connection portion 342b and other parts.

Further, in the present embodiment, as described above, the concentrically wound coil 30 is formed by winding a rectangular conductor, and the bent portion 34a is formed by flatwise bending that bends the long side of the cross-section of the rectangular conductor. Thus, since the bent portion 34a is formed by flatwise bending that allows relatively easy bending compared to edgewise bending, the bent portion 34a can easily be formed.

(Method of Manufacturing Stator)

A method of manufacturing the stator 100 according to the present embodiment will be described with reference to M. 15.

First, the in-slot conductor portions 31 of all the concentrically wound coils 30 forming an annular cage-shaped coil assembly are pressed toward radially outer side. Thus, all the concentrically wound coils 30 are pressed radially from the radially inner side toward the radially outer side, so that the concentrically wound coils 30 are attached to the stator core 10. Then, the lead wire portion 34 of each concentrically wound coil 30 is bent. This bending is performed such that the radially-inner-side lead wire portion 34 extends radially outward across the lead-side coil end conductor portion 32 so as to connect the distal end (the connection portion 342b) of the radially-inner-side lead wire portion 34 of one concentrically wound coil 30 of two concentrically wound coils 30 disposed apart from each other by a predetermined distance in the circumferential direction to the distal end (the connection portion 35a) of the radially-outer-side lead wire portion 35 of the other concentrically wound coil 30.

Figure 15:
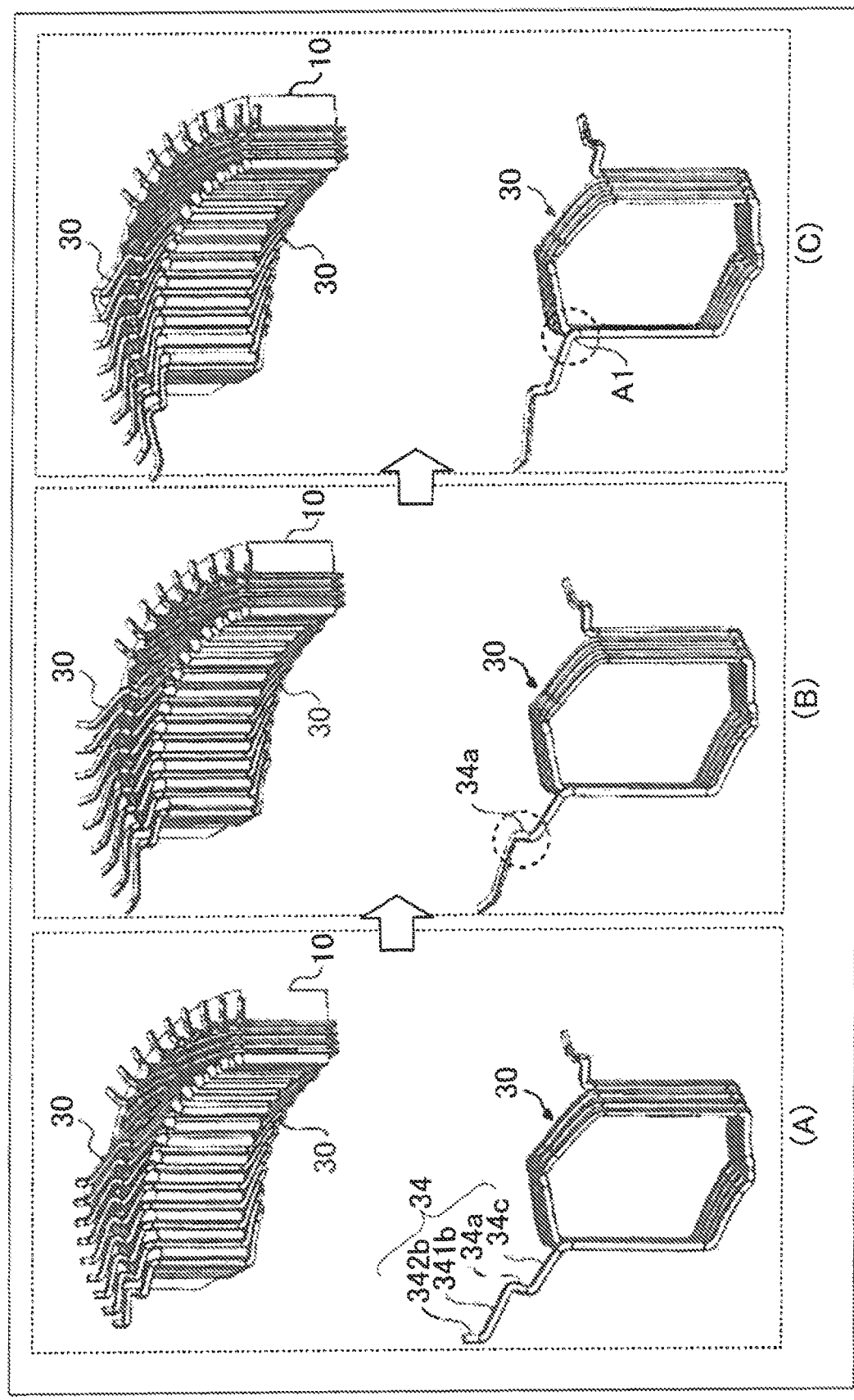
FIG. 15 is a diagram illustrating a method of manufacturing the stator according to the embodiment of the present disclosure.

More specifically, before the bending by a stator manufacturing apparatus (not illustrated), the radially-inner-side lead wire portion 34 is formed to include the extension portion 34c, the bent portion 34a, the portion 341b, and the connection portion 342b that are substantially concentrically formed (FIG. 15 (A)). First, the inner-diameter side lead wire portion 34 is bent flatwise by the stator manufacturing apparatus (not illustrated), using the bent portion 34a (the portion surrounded by the dashed line in FIG. 15(B)) extending substantially axially as a fulcrum, such that a portion (more specifically, the portion 341b, and the connection portion 342b) located on the distal end side with respect to the bent portion 34a is laid radially outward (FIG. 15(B)). Then, using a bent part A1 (a portion surrounded by the dashed line in FIG. 15(C)) as a fulcrum, a portion (more specifically, the extension portion 34c, the bent portion 34a, the portion 341b, and the connection portion 342b, that is, the entire radially-inner-side lead wire portion 34) located on the distal end side with respect to the bent part A1 is bent edgewise (in the counterclockwise direction in FIG. 15) so as to come closer to the axial end face of the stator core 10 while extending in the circumferential direction of the stator core 10 (FIG. 15(C)). In this step, at least a part of the bent portion 34a is disposed in the valley portion V closest to the extension portion 34c in the radial direction (FIGS. 13 and 14).

[Modification]

The presently disclosed embodiment should be considered in all respects to be illustrative and not restrictive. All variations (modifications) of the disclosure which come within the meaning and range of equivalents thereof are intended to be embraced therein.

For example, in the above embodiment, a concentrically wound coil formed of a rectangular conductor is used. However, the present disclosure is not limited thereto. For example, coils other than a concentrically wound coil formed of a rectangular conductor may be used. More specifically, a coil may be formed of a conductor such as a round conductor and a conductor with an elliptical cross-sectional shape.

Further, in the above embodiment, the coils are continuous coils (concentrically wound coils) configured such that one lead wire portion on the radially inner side and another lead wire portion on the radially outer side among the plurality of concentrically wound coils need to be connected (welded). However, the present disclosure is not limited thereto. For example, the coils may be wave wound coils 50 (continuous coils) (see FIG. 16) configured such that one lead wire portion on the radially inner side and another lead wire portion on the radially outer side among the plurality of coils need to be connected (welded).

Figure 16:
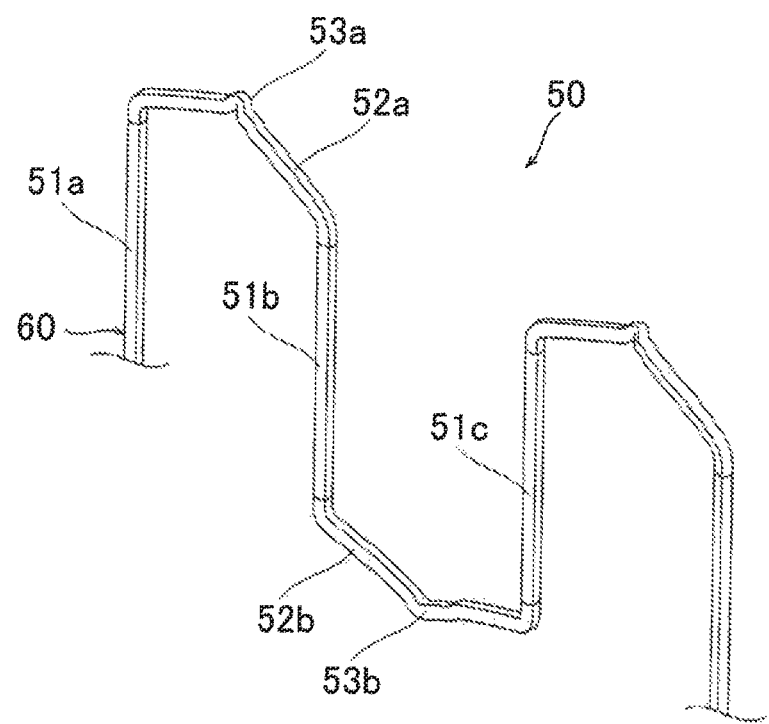
FIG. 16 is a perspective view of a wave wound coil according to a modification of the embodiment of the present disclosure.

More specifically, as illustrated in FIG. 16, the wave wound coil 50 includes in-slot portions 51a, 51b, and 51c accommodated in different slots 13, a coil end portion 52a connecting the in-slot portions 51a and 51b to each other on one axial side, and a coil end portion 52b connecting the in-slot portions 51b and 51c to each other on the other axial side. That is, the wave wound coil 50 is formed of a single conductor wire 60 without being joined by welding or the like. The coil end portions 52a and 52b include, respectively, offset portions 53a and 53b, each being radially offset by a width of the single conductor wire 60. The wave wound coils 51) are an example of "coils."

Further, in the above embodiment, a concentrically wound coil formed by winding a rectangular conductor in a plurality of turns is used. However, the present disclosure is not limited thereto. For example, a coil formed by winding a rectangular conductor (or a conductor other than a rectangular conductor) in a single turn may be used.

Further, in the above embodiment, a stator-core-side (Z2-direction-side) part of the bent portion is disposed in a valley portion, as viewed from the circumferential direction. However, the present disclosure is not limited thereto. For example, as long as the bent portion and the peak portions are not in contact with each other, the entire bent portion may be disposed in a valley portion.

Further, in the above embodiment, the bent portion is disposed between the peak portions located on the innermost peripheral side. However, the present disclosure is not limited thereto. For example, the bent portion may be disposed between the peak portions located on the outer peripheral side with respect to the peak portions located on the innermost peripheral side, in addition to the peak portions located on the innermost peripheral side.

Further, in the above embodiment, the end-side portion (the portion 341b, see FIG. 9) continuous from the bent portion extends to cross (to cross at an angle less than 90 degrees) the circumferential direction, as viewed from the axial direction. However, the present disclosure is not limited thereto. For example, the end-side portion continuous from the bent portion may extend orthogonally to the circumferential direction, as viewed from the axial direction.

Further, in the above embodiment, the bent portion is bent at an angle of approximately 90 degrees from the radially inner side to the radially outer side. However, the present disclosure is not limited thereto. For example, the bent portion may be bent at an angle greater than 90 degrees, or at an angle less than 90 degrees in a manner not to come into contact with the peak portions.

Further, in the above embodiment, a connection portion of one lead wire portion and a connection portion of another lead wire portion among the plurality of concentrically wound coils are connected (welded) on the radially outer side of the stator core. However, the present disclosure is not limited thereto. For example, a connection portion of one lead wire portion and a connection portion of another lead wire portion among the plurality of concentrically wound coils may be connected (welded) on the radially inner side of the stator core.

Further, in the above embodiment, the extension portion on the radially innermost side is disposed in a valley portion on the radially inner side. However, the present disclosure is not limited thereto. For example, the extension portion on the radially outermost side may be disposed in a valley portion on the radially outer side. In this case, the bent portion of the lead wire portion is disposed in a valley portion so as to overlap the peak portions on the radially outer side as viewed from the circumferential direction, and a circumferential width portion of the bent portion is disposed not to overlap the peak portions as viewed from the radially outer side.

The invention claimed is:

1. A stator comprising:
   a stator core having a plurality of slots; and
   a coil unit formed of a plurality of coils disposed in the plurality of slots;
   wherein the coil unit includes a coil end portion projecting from an axial end face of the stator core;
   wherein the coil end portion includes a plurality of peak portions projecting axially outward and arranged in a circumferential direction, and a plurality of lead wire portions for supplying electric power to the coils;
   wherein each of the plurality of lead wire portions includes an extension portion extending at least in an axial direction, an end-side portion at an end of a respective lead wire portion and extending at least in a radial direction and a bent portion that is between and connects the extension portion and the end-side portions; and
   wherein the bent portion is bent at least from the axial direction to the radial direction, at least a part of the bent portion being disposed on a stator core side with respect to the peak portions in the axial direction, in a space between the peak portions that are closest to the extension portion in the radial direction and that are adjacent in the circumferential direction.

2. The stator according to claim 1, wherein the bent portion is disposed between the peak portions arranged in the circumferential direction, while being spaced apart from the peak portions.

3. The stator according to claim 1, wherein a distal end portion of each of the plurality of lead wire portions is configured to be disposed on an outer side with respect to the peak portions disposed on an outermost periphery, as viewed from the axial direction.

4. The stator according to claim 1,
   wherein each of the plurality of coils is formed by winding a rectangular conductor; and
   wherein the bent portion is formed by flatwise bending that bends a long side of a cross-section of the rectangular conductor.

5. The stator according to claim 1, wherein a circumferential width portion of the bent portion of each of the plurality of lead wire portions is disposed not to overlap the peak portions as viewed from the radial direction.

6. The stator according to claim 5, wherein a distal end portion of each of the plurality of lead wire portions is configured to be disposed on an outer side with respect to the peak portions disposed on an outermost periphery, as viewed from the axial direction.

7. The stator according to claim 5,
   wherein each of the plurality of coils is formed by winding a rectangular conductor; and
   wherein the bent portion is formed by flatwise bending that bends a long side of a cross-section of the rectangular conductor.

8. The stator according to claim 5, wherein the bent portion is disposed between the peak portions arranged in the circumferential direction, while being spaced apart from the peak portions.

9. The stator according to claim 8,
   wherein the end-side portion extends radially outward while being spaced apart from the peak portions so as to be continuous from the bent portion that is disposed apart from the peak portions; and wherein a distance between the end-side portion and the peak portions is less than an inner curvature radius of the bent portion.

10. The stator according to claim 9, wherein a portion of the end-side portion is disposed on an axially outer side of the peak portions, and is disposed to extend substantially linearly.

11. The stator according to claim 5, wherein the bent portion is bent from an innermost peripheral side of the stator core to a radially outer side, and is disposed between the peak portions located on the innermost peripheral side.

12. The stator according to claim 11, wherein the bent portion is disposed between the peak portions arranged in the circumferential direction, while being spaced apart from the peak portions.

13. The stator according to claim 12, wherein the end-side portion extends radially outward while being spaced apart from the peak portions so as to be continuous from the bent portion that is disposed apart from the peak portions; and wherein a distance between the end-side portion and the peak portions is less than an inner curvature radius of the bent portion.

14. The stator according to claim 13, wherein a portion of the end-side portion is disposed on an axially outer side of the peak portions, and is disposed to extend substantially linearly.

15. The stator according to claim 14, wherein a distal end portion of each of the plurality of lead wire portions is configured to be disposed on an outer side with respect to the peak portions disposed on an outermost periphery, as viewed from the axial direction.

16. The stator according to claim 15, wherein each of the plurality of coils is formed by winding a rectangular conductor; and wherein the bent portion is formed by flatwise bending that bends a long side of a cross-section of the rectangular conductor.

17. The stator according to claim 1, wherein the bent portion is bent from an innermost peripheral side of the stator core to a radially outer side, and is disposed between the peak portions located on the innermost peripheral side.

18. The stator according to claim 17, wherein the bent portion is disposed between the peak portions arranged in the circumferential direction, while being spaced apart from the peak portions.

19. The stator according to claim 18, wherein a distal end portion of each of the plurality of lead wire portions is configured to be disposed on an outer side with respect to the peak portions disposed on an outermost periphery, as viewed from the axial direction.

20. The stator according to claim 18, wherein each of the plurality of coils is formed by winding a rectangular conductor; and wherein the bent portion is formed by flatwise bending that bends a long side of a cross-section of the rectangular conductor.

* * * * *